US010348648B2

(12) United States Patent
Pignataro et al.

(10) Patent No.: US 10,348,648 B2
(45) Date of Patent: Jul. 9, 2019

(54) SERVICE CHAIN OVERLAY NETWORK OPERATIONS VISIBILITY VIA DATA PACKETS

(71) Applicant: Cisco Technology, Inc., San Jose, CA (US)

(72) Inventors: Carlos M. Pignataro, Raleigh, NC (US); Frank Brockners, Cologne (DE); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 413 days.

(21) Appl. No.: 15/156,689

(22) Filed: May 17, 2016

(65) Prior Publication Data
US 2017/0339072 A1 Nov. 23, 2017

(51) Int. Cl.
*H04L 29/06* (2006.01)
*H04L 29/08* (2006.01)
(Continued)

(52) U.S. Cl.
CPC .......... *H04L 49/3009* (2013.01); *H04L 45/64* (2013.01); *H04L 67/32* (2013.01); *H04L 69/22* (2013.01)

(58) Field of Classification Search
CPC ..... H04L 49/3009; H04L 45/64; H04L 67/32; H04L 69/22
See application file for complete search history.

(56) References Cited

U.S. PATENT DOCUMENTS 7,373,660 B1 5/2008 Guichard et al.
8,000,251 B2 8/2011 Epps et al.
(Continued)

OTHER PUBLICATIONS

Jeyakumar et al., "Tiny Packet Programs for low-latency network control and monitoring," Nov. 21-22, 2013, Association for Computing Machinery: Hotnets '13, College Park, MD, USA (7 pages).
(Continued)

*Primary Examiner* — Glenton B Burgess
*Assistant Examiner* — Rachel J Hackenberg
(74) *Attorney, Agent, or Firm* — The Law Office of Kirk D. Williams

(57) ABSTRACT

In one embodiment, a particular service chain data packet is received by a particular service node, with the service chain data packet including a header identifying service chain information. The particular service node applies a service to the particular service chain data packet. The particular service node adds service-layer operations data to the particular service chain data packet, with the service-layer operations data related to the current service function or the particular service node. Subsequently, the particular service node sends the particular service chain data packet with the service-layer operations data from the particular service node. In one embodiment, networking operations data is also added to the particular service chain data packet. In one embodiment, an egress service node removes the service-layer (and possibly networking) operations data and forwards to another system, possibly after processing this operations data.

26 Claims, 7 Drawing Sheets

SERVICE NODE PROCESSING

(51) Int. Cl.
*H04L 12/715* (2013.01)
*H04L 12/935* (2013.01)
*G06F 15/173* (2006.01)

(56) References Cited

U.S. PATENT DOCUMENTS

| | | | |
|---|---|---|---|
| 9,374,320 | B2 | 6/2016 | Xu et al. |
| 9,906,560 | B2* | 2/2018 | Jain ............... G06F 16/9024 |
| 2014/0029449 | A1 | 1/2014 | Xu et al. |
| 2014/0226662 | A1* | 8/2014 | Frost ............... H04L 45/74 370/392 |
| 2015/0195197 | A1* | 7/2015 | Yong ............... H04L 45/74 370/392 |
| 2016/0028640 | A1* | 1/2016 | Zhang ............... H04L 45/306 370/389 |
| 2016/0080253 | A1* | 3/2016 | Wang ............... H04L 12/6418 370/392 |
| 2016/0134531 | A1* | 5/2016 | Assarpour ............... H04L 45/74 370/392 |
| 2017/0331669 | A1* | 11/2017 | Ganesh ............... H04L 41/0213 |
| 2017/0331737 | A1* | 11/2017 | Ruan ............... H04L 69/22 |

OTHER PUBLICATIONS

Lai et al., "A Framework for Internet Traffic Engineering Measurement," IETF Draft draft-ietf-tewg-measure-00.txt, Aug. 2001, The Internet Society, Reston, VA (18 pages).
Nadeau et al., "Operations and Management (OAM) Requirements for Multi-Protocol Label Switched (MPLS) Networks," RFC 4377, Feb. 2006, The Internet Society, Reston, VA (15 pages).
Quinn et al., "Problem Statement for Service Function Chaining," RFC 7498, Apr. 2015, The Internet Society, Reston, VA (13 pages).
Quinn et al., "Network Service Header," draft-ieff-sfc-nsh-01.txt, Jul. 23, 2015, The Internet Society, Reston, VA (43 pages).
Quinn et al., "Network Service Header," draft-quinn-sfc-nsh-07.txt, Feb. 24, 2015, The Internet Society, Reston, VA (43 pages).
Filsfils et al., "Segment Routing Architecture," draft-filsfils-rtgwg-segment-routing-01, Oct. 21, 2014, The Internet Society, Reston, VA (28 pages).
Previdi et al, "IPv6 Segment Routing Header (SRH)," draft-ietf-6man-segment-routing-header-01, Mar. 18, 2016, The Internet Society, Reston, VA (29 pages).
Aldrin et al., "Service Function Chaining Operation, Administration and Maintenance Framework," draft-ietf-sfc-oam-framework-01, Feb. 18, 2016, The Internet Society, Reston, VA (10 pages).
H. Kitamura, "Record Route for IPv6 (RR6) Hop-by-Hop Option Extension," draft-kitamura-ipv6-record-route-00.txt, Nov. 17, 2000, The Internet Society, Reston, VA (15 pages).
Previdi et al, "IS-IS Extensions for Segment Routing," draft-previdi-isis-segment-routing-extensions-05, Feb. 13, 2014, The Internet Society, Reston, VA (27 pages).
Quinn et al., "Network Service Header," draft-quinn-nsh-02.txt, Feb. 12, 2014, The Internet Society, Reston, VA (21 pages).
Quinn et al., "Service Function Chaining (SFC) Architecture," draft-quinn-sfc-arch-05.txt, May 5, 2014, The Internet Society, Reston, VA (31 pages).
Frank Brockners, "Always on visibility: In-Band OAM for IPv6," BRKRST-2606, Cisco Live 2015, San Diego, Jun. 2015, Cisco Systems, Inc., San Jose, CA (seventy-eight pages).
Frank Brockners, "What if you had a trip-recorder for all of your traffic at line rate performance?," May 19, 2015, https:/lblogs.cisco.eom/getyourbuildon/a-trip-recorder-for-all-your-traffic, Cisco Systems, Inc., San Jose, CA (four pages).
Frank Brockners, "Verify my service chain!," Jun. 3, 2015, https/lblogs.cisco.com/getyourbuildon/verify-my-service-chain, Cisco Systems, Inc., San Jose, CA (five pages).

\* cited by examiner

SEGMENT ROUTING
HEADER
300

| NEXT HEADER | HDR EXT LEN | ROUTING TYPE | SEGMENTS LEFT |
|---|---|---|---|
| FIRST SEGMENT | FLAGS || RESERVED |
| SEGMENT LIST[0]<br>(INCLUDING AN IDENTIFICATION OF A SERVICE NODE AND POSSIBLY<br>SERVICE LAYER AND/OR TRANSPORT LAYER<br>OPERATIONS DATA COLLECTION INSTRUCTION IN ONE EMBODIMENT ||||
| ⋮ ||||
| SEGMENT LIST[N]<br>(INCLUDING AN IDENTIFICATION OF A SERVICE NODE AND POSSIBLY<br>SERVICE LAYER AND/OR TRANSPORT LAYER<br>OPERATIONS DATA COLLECTION INSTRUCTION IN ONE EMBODIMENT) ||||
| OPTIONAL TYPE LENGTH VALUE OBJECTS (TLVS)<br>(INCLUDING SERVICE LAYER AND/OR TRANSPORT LAYER OPERATIONS DATA<br>COLLECTION INSTRUCTIONS AND POSSIBLY COLLECTED SERVICE LAYER AND/OR<br>TRANSPORT LAYER OPERATIONS DATA IN ONE EMBODIMENT) ||||

FIGURE 3A

IPV6 EXTENSION
HEADER
330

| NEXT HEADER || OAM TYPE | REC POINTER |
|---|---|---|---|
| FLAGS | MAX NODE DATA | MAX NODE DATA | RESERVED |
| SERVICE LAYER AND/OR TRANSPORT LAYER<br>OPERATIONS DATA STORAGE AND/OR INSTRUCTIONS ||||

FIGURE 3B

INGRESS SERVICE NODE PROCESSING

SERVICE NODE PROCESSING

EGRESS SERVICE NODE PROCESSING

US 10,348,648 B2

SERVICE CHAIN OVERLAY NETWORK OPERATIONS VISIBILITY VIA DATA PACKETS

TECHNICAL FIELD

The present disclosure relates generally to packet switching network communications, including, but not limited to, operations visibility into service chain overlay networks using data packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies. Additionally, service chaining overlay networks allow services applied to packets to be distributed in a transport network.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

FIG. 3A illustrates a portion of a data packet according to one embodiment;

FIG. 3B illustrates a portion of a data packet according to one embodiment;

DESCRIPTION OF EXAMPLE EMBODIMENTS

1. Overview

Figure 1A:
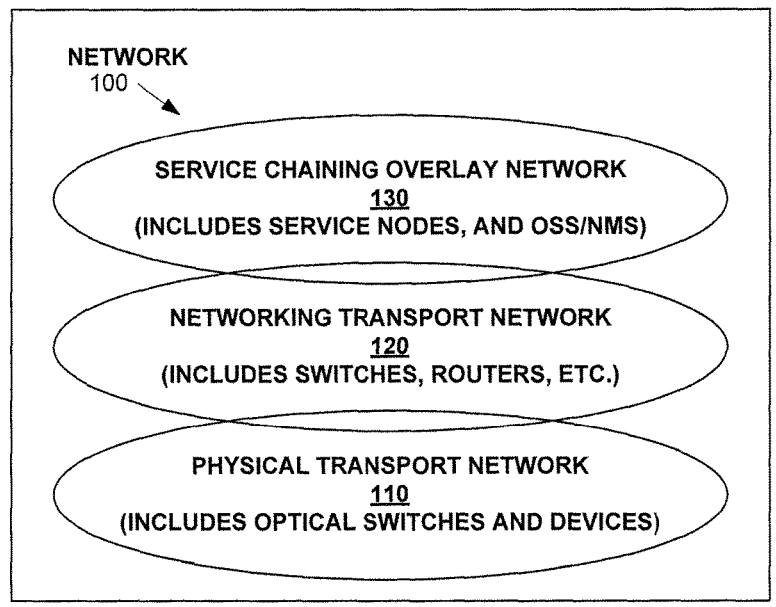
FIG. 1A illustrates a network operating according to one embodiment.

Disclosed are, inter alia, methods, apparatus, computer-storage media, mechanisms, and means associated with visibility into service chain overlay network operations using data packets. One embodiment performs a method, comprising: receiving a particular service chain data packet by a particular service node, with the particular service chain data packet including a header identifying a service group defining one or more service functions to be applied to the particular service chain data packet, with the particular service chain data packet being a data packet and not a probe packet; applying a current service function corresponding to a current entry of the service group to the particular service chain data packet by the particular service node; adding service-layer operations data to the particular service chain data packet by the particular service node, with the service-layer operations data related to the current service function or the particular service node; and after applying and adding operations, sending the particular service chain data packet with the service-layer operations data from the particular service node.

One embodiment performs a method, comprising: receiving a particular service chain data packet by a particular service node, with the particular service chain data packet including a header identifying a service group defining one or more service functions to be applied to the particular service chain data packet, with the particular service chain data packet being a data packet and not a probe packet; adding service-layer operations data or networking operations data to the particular service chain data packet by the particular service node in response to a current entry of the service group to the particular service chain data packet; and after the adding operations, sending the particular service chain data packet with the service-layer or networking operations data from the particular service node.

2. Example Embodiments

Disclosed are, inter alia, methods, apparatus, computer-storage media, mechanisms, and means associated with visibility into service chain overlay network operations using data packets. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these term's herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Disclosed are, inter alia, methods, apparatus, computer-storage media, mechanisms, and means associated with visibility into service chain overlay network operations using data packets. One embodiment performs a method, comprising: receiving a particular service chain data packet by a particular service node, with the particular service chain data packet including a header identifying a service group defining one or more service functions to be applied to the particular service chain data packet, with the particular service chain data packet being a data packet and not a probe packet; applying a current service function corresponding to a current entry of the service group to the particular service chain data packet by the particular service node; adding service-layer operations data to the particular service chain data packet by the particular service node, with the service-layer operations data related to the current service function or the particular service node; and after applying and adding operations, sending the particular service chain data packet with the service-layer operations data from the particular service node.

One embodiment performs a method, comprising: receiving a particular service chain data packet by a particular service node, with the particular service chain data packet including a header identifying a service group defining one or more service functions to be applied to the particular service chain data packet, with the particular service chain data packet being a data packet and not a probe packet; adding service-layer operations data or networking operations data to the particular service chain data packet by the particular service node in response to a current entry of the service group to the particular service chain data packet; and after the adding operations, sending the particular service chain data packet with the service-layer or networking operations data from the particular service node.

As used herein, a "data packet" refers to a standard packet communicating information (such as a customer data packet), with a probe packet (e.g., test packet) not being included in the definition of a data packet. As used herein, a "service chain data packet" refers to a data packet which is being forwarded through a service chain of one or more service nodes for having one or more services applied to the service chain data packet. As used herein, a "service chain" refers to a series of one or more service nodes which perform or apply services to a service chain data packet. In one embodiment, such a service is to add service-layer operations data to a service chain data packet. One embodiment uses Segment Routing or Network Service Header (NSH) in forwarding a service chain data packet through the service chain of one or more service nodes.

As used herein, "service chain operations data" refers to operations, administration, maintenance, and/or provisioning information related to the service health and/or performance info' nation of service nodes and/or services themselves, but not to such information related to the communication of a packet through a network which is referred to herein as "networking operations data." In other words, service chain operations data refers to information related to the service chain overlay network, while networking operations data refers to information related to the network and/or physical transport underlay networks (such as described infra in relation to FIG. 1A).

As used herein, "identifying a service group defining one or more service functions" refers to, but is not limited to, including a list or set of one or more service nodes or service functions in a service chain data packet, with this list or set of service nodes represented, inter alia, as one or more addresses, system identifiers, service functions, encoded values (e.g., a product of one or more prime numbers), and/or lookup values, or even determining a tunnel to use to forward the service chain data packet through a service chain (e.g., using Virtual Extensible Local Area Network—"VXLAN," Generic Routing Encapsulation—"GRE," Locator/ID Separation Protocol—"LISP").

Network service chaining, including network functions virtualization (NFV), uses networking capabilities to create a service chain of connected network services and connect them in a virtual chain. Examples of such network services include, but are not limited to, layer four to seven services like firewalls, network address translation (NAT), deep packet inspection, intrusion protection, security, encryption, video and/or audio caching, and content filters.

Under prior approaches, there is very little information available to understand the health of a service chain as, for example, they use out of band techniques to monitor the physical or virtual machine which runs the service (e.g., monitor CPU and memory) using Simple Network Management Protocol (SNMP). In other words, the service and/or service chain is not monitored; rather, the service appliances or virtual machines are monitored instead.

One embodiment adds service chain operations data to service chain data packets to provide visibility into service health and/or performance information related to the actual service chain data packet. One embodiment also adds networking operations data to service chain data packets to provide visibility into network health and/or performance information related to the actual service chain data packet.

Adding both service-layer and networking operations data to a data packet provides correlated information about the health of the individual service appliances with the network health on a packet by packet basis. Therefore, a service-layer service level agreement (SLA) can be monitored and the root cause of non-compliance can be investigated from this correlated information. For example in a service chain providing video applications and/or content delivery networks (CD), a cause of a delay or performance degradation can be investigated: whether this issue is due to a cache overload (e.g., related to a fill-level operations data of the video cache), whether this issue is due to delay or packet drops at the network layer, or a combination. As a result, corrective action can be taken including, but not limited to, scaling out a service (add another service appliance, or move the appliance to a machine with more CPU), re-route the traffic in the network, reconfigure the network or service appliances, etc.

Further, operations data may include performance metrics as well as attributes. As used herein, a service-layer performance metric refers to a performance characteristic of the application of the service to a packet, while an attribute refers to characteristic of the service and/or service node itself (e.g., a current load condition of the service node). For example, a service chain may include a firewall or network address translation (NAT). One service-layer performance characteristic is how long it took to perform the service. In contrast, one service-layer attribute is the number of bindings available or currently in use; the identification of the service-layer application, possibly including the identification of the particular tenant (e.g., which client-related service was applied as a service may be configured to perform operations on multiple tenants).

Service chaining receives widespread deployment, ranging from video applications, content distribution networks, to the cloud. Many of these deployments need to conform to tight SLAs to ensure a proper quality of experience. Continuous availability of granular performance metrics is important to proving the SLA, as well as reacting to SLA-violations quickly. Tight SLAs for service chains require continuous availability of metrics such as delay, packet drops, etc. between any two points in the service chain. Individual hops in a service chain can be several network-hops away.

One embodiment continuously offer detailed statistics (e.g., loss, delay, but also application specific parameters such as current load of a cache etc.) for the entire service chain. One embodiment provides networking and/or service operations data at individual packet level, so that transient issues can be captured (as opposed to collecting only high-level average values).

To achieve networking and service-chain overlay network operations visibility, one embodiment inserts networking and/or operations data directly into network traffic in extension headers available in Internet Protocol version 6 (IPv6), in segment routing headers, in network service headers, in IPv4 (e.g., in a UDP header carrying the metadata), Virtual Extensible Local Area Network-Generic Protocol Extension (VXLAN-GPE). In one embodiment, VXLAN-GPE encapsulation resembles IPv6 extension headers in that a series of headers can be contained in the header.

This operations data is then used, including, but not limited to, for troubleshooting, planning, and path or service chain verification. The operations data is inserted at selected nodes and typically retrieved from an egress device (e.g., egress service node). In one embodiment, this operations data includes, but is not limited to, ingress or egress interface identifier, time-stamp, node or service identifier, tenant identifier, share of a secret describing a service or network element, sequence number, and/or generic application metadata.

In one embodiment, this inserted and collected operations data is used for path and/or service chain verification by adding operations data related to the actual service chaining and/or network path taken. In one embodiment, this collected operations data includes Node Segment Identifier (Node-SID), Node service set identifiers (SSID), timestamp, and/or ingress and egress interface identifiers. This verification can prove that certain traffic (e.g., traffic associated with an application identified by source and destination IP addresses, ports, and protocol used) traverses a particular service chain or path. One embodiment adds operations data of delay and loss metrics to data packets to provide additional visibility into the actual path taken by data packet. In one embodiment, this inserted and collected operations data is used for flow tracing through a network and detecting paths with issues. In one embodiment, networking and service nodes selectively insert corresponding operations data. In one embodiment, application specific operations data is added at every node into the data packet.

FIG. 1A illustrates a network 100 operating according to one embodiment. As shown, network 100 includes the three network layers of physical transport network 110 (e.g., optical switches and devices, facilities), networking transport network 120 (e.g., switches, routers), and service chaining overlay network 130 (e.g., service nodes, which as shown includes also network management and operations support systems in one embodiment). FIG. 1A illustrates the hierarchical nature of network 100, with service-layer operations data related to service chaining overlay network 130, networking operations data related to networking transport network 120, and physical operations data related to physical transport network 110.

Figure 1B:
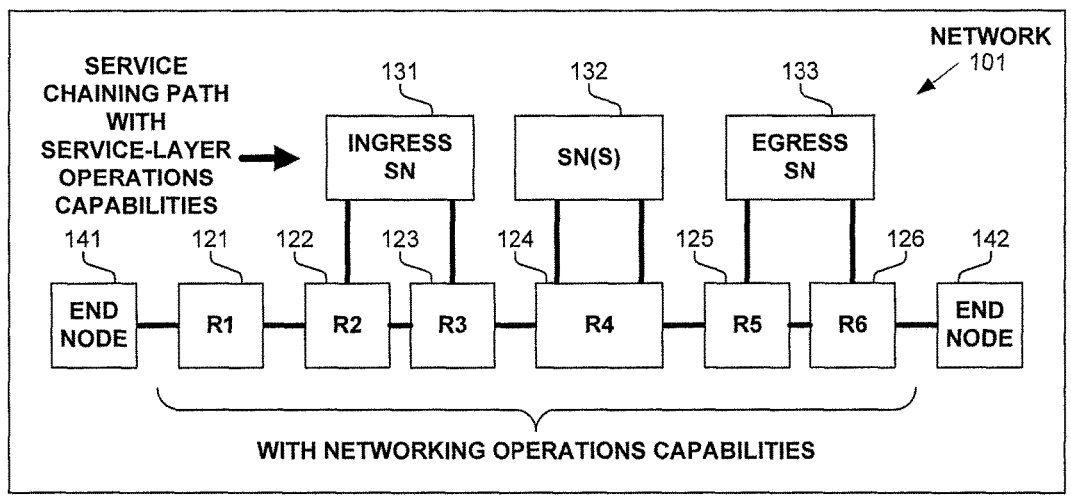
FIG. 1B illustrates a network operating according to one embodiment.

FIG. 1B illustrates a network 101 operating according to one embodiment. As shown, two end nodes 141, 142 (e.g., devices, servers) are communicatively coupled via networking transport network routers R1-R6 (121-126), with service chaining overlay network nodes 131-133 communicatively coupled as shown. Service chaining overlay network nodes 131-133 include capabilities to initialize, add, and/or remove service-layer operations data. Networking transport network networking nodes R1-R6 (121-126) include capabilities to initialize, add, and/or remove networking operations data. In one embodiment, additional service node(s) are added to service chaining path of certain data paths to add operations data to the packet in order gain additional insight into the network.

Figure 2A:
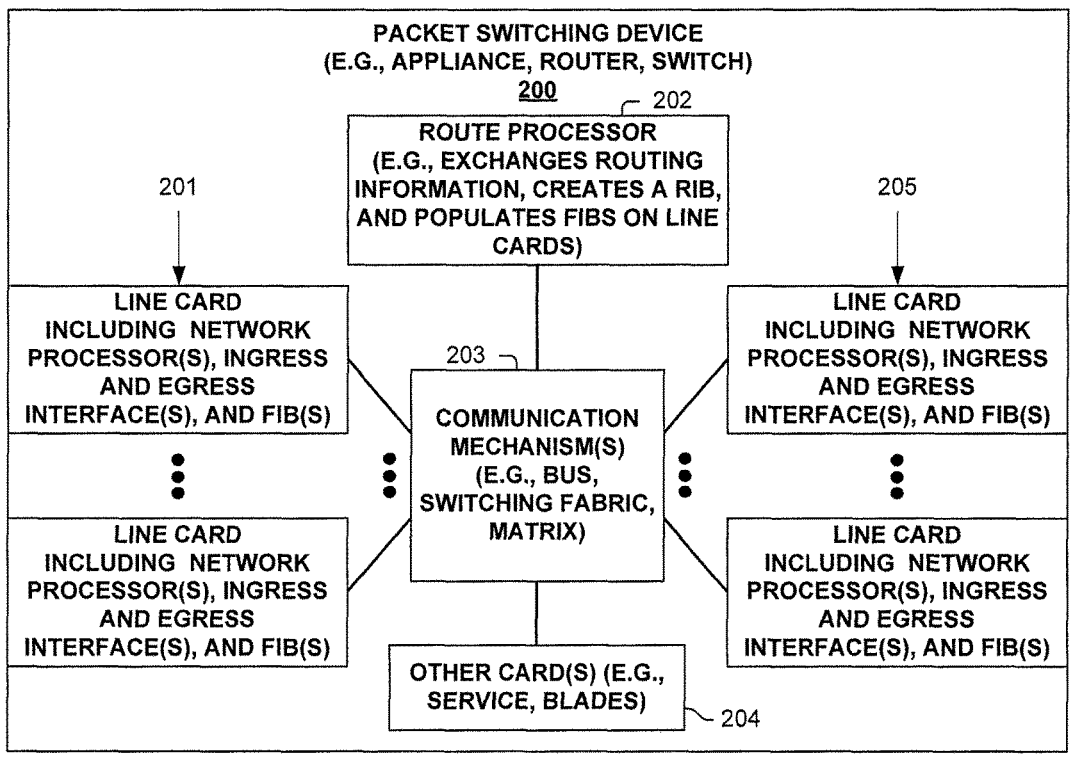
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with visibility into service chain overlay network operations using data packets. Packet switching device 200 also has a control plane with one or more processing elements 202 for managing the control plane and/or control plane processing of packets associated with visibility into service chain overlay network operations using data packets. Packet switching device 200 also includes other cards 204 (e.g., service cards, blades) which include processing elements that are used in one embodiment to process packets associated with visibility into service chain overlay network operations using data packets, and some communication mechanism 203 (e.g., bus, switching fabric, matrix) for allowing its different entities 201, 202, 204 and 205 to communicate. In one embodiment, route processor 202 and/or line card(s) 201 perform lookup operations in a mapping database.

Line cards 201 and 205 typically perform the actions of being both an ingress and egress line card, in regards to multiple other particular packets and/or packet streams being received by, or sent from, packet switching device 200. In one embodiment, line cards 201 and/or 205 perform packet processing operations, including, but not limited to, determining how to ingress and/or egress process packets. Even though the term FIB includes the word "forwarding," this information base typically includes other information describing how to process corresponding packets.

Figure 2B:
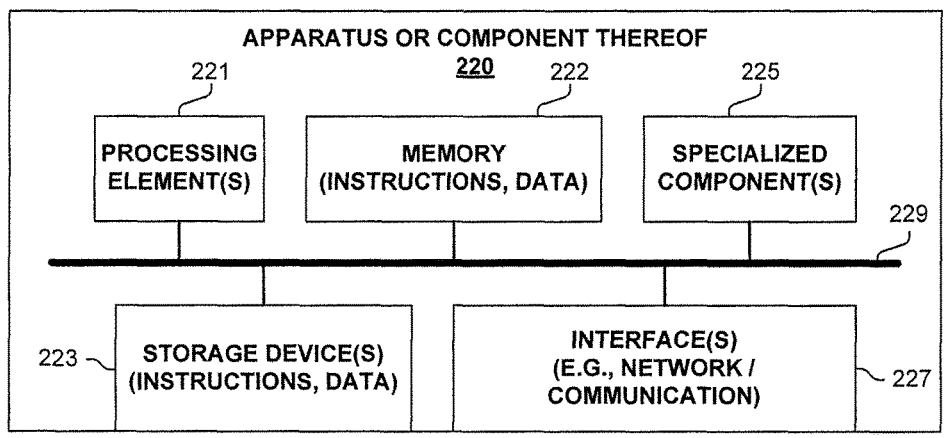
FIG. 2B illustrates an apparatus or component thereof according to one embodiment.

FIG. 2B is a block diagram of an apparatus 220 used in one embodiment associated with visibility into service chain overlay network operations using data packets. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221 (typically with on-chip memory), memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

FIG. 3A illustrates a segment routing header 300 of a data packet according to one embodiment. In one embodiment, a segment in the segment list as an instruction that triggers the particular segment to enable adding service-level and/or networking operations data to data packets on one or more segments. In one embodiment, the particular segment instructs the node to capture performance metrics in an IPv6 extension header 330 (of FIG. 3B). In one embodiment, this instruction is a Segment List element. In one embodiment, the instructions are encoded as TLVs in the segment routing header. In one embodiment, an instruction defines what service-level and/or networking operations data to add to a packet, and for what node(s) to perform this operation.

Figure 3C:
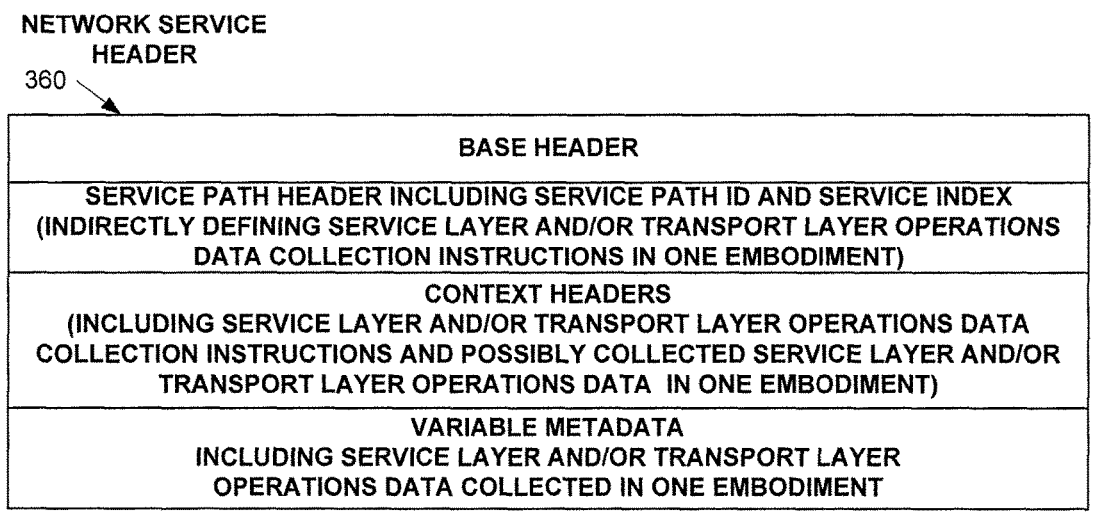
FIG. 3C illustrates a portion of a data packet according to one embodiment.

FIG. 3C illustrates a network service header (NSH) 360 of a data packet according to one embodiment. In one embodiment, a Service part of the Service Path is included in NSH 360, which triggers the adding of operations data to a data packet. One embodiment uses context meta-data to the NSH to trigger the adding of operations data to a data packet. In one embodiment, an instruction defines what operations data to add to a packet, and for what node(s) to perform this operation.

Figure 4A:
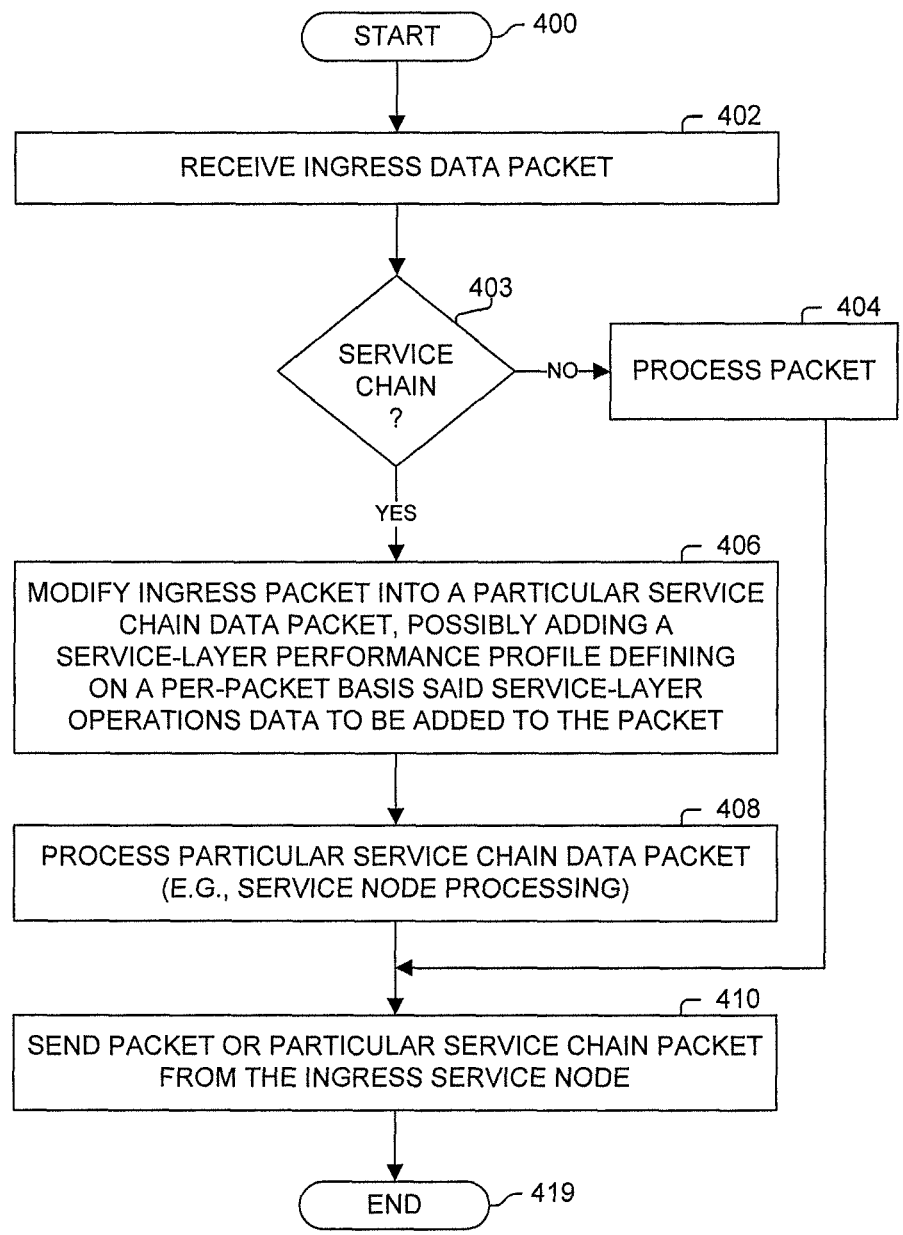
FIG. 4A illustrates a process according to one embodiment.

FIG. 4A illustrates a process according to one embodiment. Processing begins with process block 400. In process block 402, an ingress data packet is received by an ingress packet service node of a service chain. As determined in process block 403, if the packet is classified to have one or more services applied to the packet via a service chain, then processing proceeds to process block 403; otherwise, the packet is processed in process block 404 (e.g., determine forwarding information) and processing proceeds to process block 410. In process block 403, the ingress data packet is modified into a service chain data packet, such as by, but not limited to, adding a segment routing header or NSH with appropriate service chaining information. In one embodiment, this added information includes a service-layer performance profile (e.g., one or more instructions) defining on a per-packet basis, what service layer operations data is to be added to the data packet. In one embodiment, the service-layer performance profile also includes instruction(s) to define what operations data is to be added by what particular node in the service chain. In one embodiment, the performance profile also defines networking operations data to be collected from particular networking transport network nodes.

In one embodiment, the service-layer performance profile provides instructions using different addresses or an additional flag for a same service to be applied to a data packet, but in one instance operations data is defined to be added to the data packet, while in another instance operations data is defined not to be added to the data packet.

Next in process block 408, the service chain packet is further processed (e.g., service applied, determine forwarding information), and processing proceeds to process block 410. Processing continues with process block 410, in which the packet or particular service chain packet is sent from the ingress service node. Processing of the flow diagram of FIG. 4A is complete as indicated by process block 419.

Figure 4B:
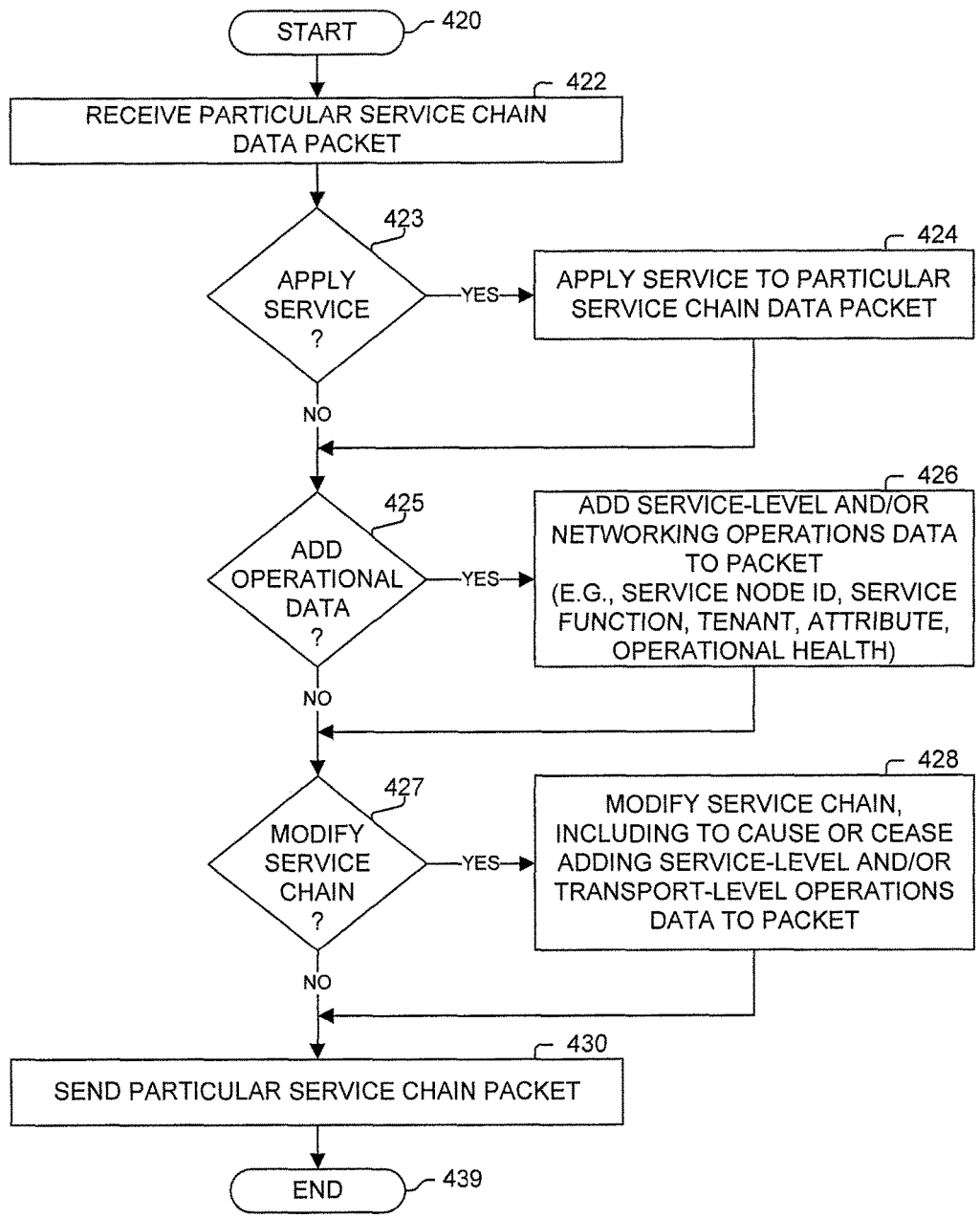
FIG. 4B illustrates a process according to one embodiment.

FIG. 4B illustrates a process performed by a service node according to one embodiment. Processing begins with process block 420. In process block 422, a particular service chain packet is received.

As determined in process block 423, if the service node is to apply a service to the received particular service chain packet, then processing proceeds to process block 424 to apply the service and then to process block 425; otherwise directly to process block 425.

As determined in process block 425, if service-level and/or operations data is to be added to the received particular service chain packet, then processing proceeds to process block 426 and then to process block 427; otherwise directly to process block 427. In process block 426, then predetermined or according to a service profile service-level and/or networking operations data is added to the received particular service chain packet.

As determined in process block 427, if the service chain of the received particular service chain packet is to be modified, then processing proceeds to process block 428 and then to process block 430; otherwise directly to process block 430. In process block 430, then the service chain is modified, such as to cause to add or cause to cease adding additional service-level and/or networking operations data to the received particular service chain packet.

Processing continues with process block 430, in which the particular service chain packet is sent from the service node. Processing of the flow diagram of FIG. 4B is complete as indicated by process block 439.

Figure 4C:
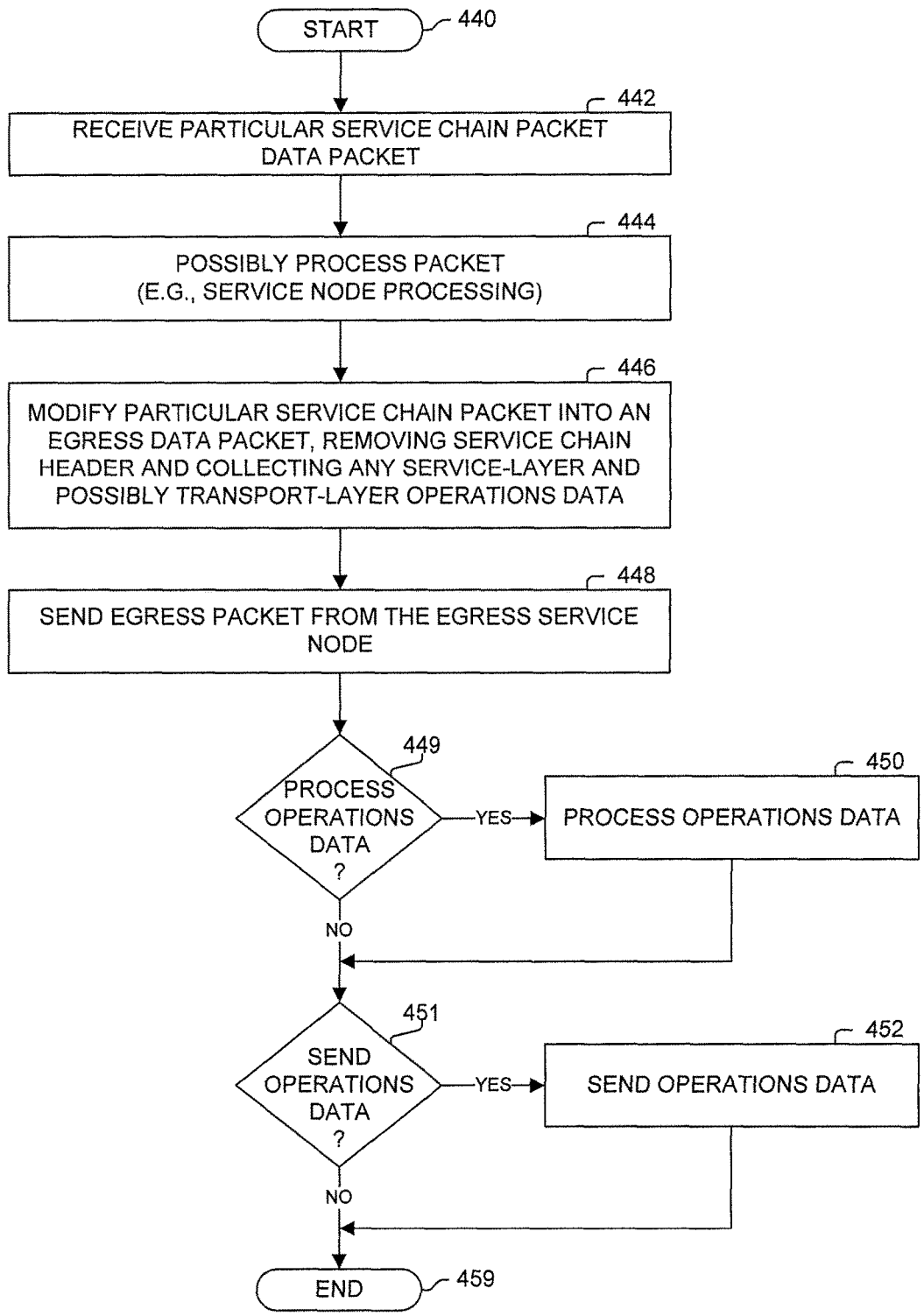
FIG. 4C illustrates a process according to one embodiment.

FIG. 4C illustrates a process performed by an egress service node according to one embodiment. Processing begins with process block 440. In process block 442, a particular service chain data packet is received. In process block 444, the received particular service chain data packet is optionally processed (e.g., a service applied to it). In process block 446, the particular service chain data packet is modified into an egress data packet with the service chaining encapsulation removed as well as service-level and/or networking operations data collected. In process block 448, the egress packet is sent from the egress service node.

Next, as determined in process block 449, if the operations data collected from the received particular service chain data packet is to be processed (e.g., updating data structures possibly including performing calculations), then the operations data is processed in process block 450 and processing proceeds to process block 451; otherwise processing proceeds directly to process block 451.

Next, as determined in process block 451, if the collected and/or processed operations data is to be sent to another system (e.g., an operations support or network management system), then this information is packaged and communicated to the other system in process block 452 and processing proceeds to process block 459; otherwise processing proceeds directly to process block 459. Processing of the flow diagram of FIG. 4C is complete as indicated by process block 459.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different foil is of data structures could be used in various embodiments. The disclosure as described herein contemplates all such embodiments as may come within the scope of the following claims and equivalents thereof.

What is claimed is:

1. A method, comprising:
    receiving a particular service chain data packet by a particular service node, with the particular service chain data packet including a header identifying a service group defining one or more service functions to be applied to the particular service chain data packet, with the particular service chain data packet being a data packet and not a probe packet;
    applying a current service function corresponding to a current entry of the service group to the particular service chain data packet by the particular service node;
    adding service-layer operations data to the particular service chain data packet by the particular service node, with said service-layer operations data related to the current service function or the particular service node; and
    after said applying and adding operations, sending from the particular service node the particular service chain data packet with said service-layer operations data.

2. The method of claim 1, wherein said service-layer operations data added by the particular service node includes an identification of the particular service node.

3. The method of claim 2, wherein said service-layer operations data added by the particular service node includes an identification of the current service function applied to the particular service chain data packet by the particular service node.

4. The method of claim 1, wherein said service-layer operations data added by the particular service node includes an identification of the current service function applied to the particular service chain data packet by the particular service node.

5. The method of claim 1, including: sending the particular service chain data packet through one or more additional particular service nodes different than the particular service node and applying one or more additional service functions corresponding to one or more entries in the service group, and with each identifiable service node of said one or more additional particular service nodes adding to the particular service chain data packet additional service-layer operations data including an identification of said identifiable service node.

6. The method of claim 1, including:
    receiving an ingress data packet by an ingress service node;
    modifying the ingress data packet into the particular service chain data packet by the ingress service node which includes adding a service-layer performance profile defining on a per-packet basis said service-layer operations data to be said added to the particular service chain data packet; and
    sending the particular service chain data packet from the ingress service node;
    wherein said adding service-layer operations data to the particular service chain data packet by the particular service node is performed in response to the particular service node identifying the particular service chain data packet including the service-layer performance profile defining said service-layer operations data to add to the particular service chain data packet.

7. The method of claim 6, wherein said service-layer operations data includes a service-layer performance metric of said applying the current service function to the particular service chain data packet and a service-layer attribute of a current operational health of a current service function.

8. The method of claim 6, including:
    receiving, by an egress particular service node, the particular service chain data packet including said added service-layer operations data;
    modifying the particular service chain data packet into an egress data packet by the egress service node which includes removing said added service-layer operations data; and
    processing said added service-layer operations data, or forwarding to another device for subsequent processing information including said added service-layer operations data or information based on said added service-layer operations data.

9. The method of claim 1, wherein the particular service node applies the current service function to a plurality of service chain data packets, with different sets of packets of the plurality of service chain data packets being associated with different tenants of a plurality of different isolated tenants; and wherein said service-layer operations data includes an identification of a particular tenant of the plurality of different isolated tenants used by the particular service node in said applying the current service function to the particular service chain data packet.

10. The method of claim 9, wherein said service-layer operations data includes a service-layer attribute of a current operational health of the current service function of the particular tenant but not of another tenant of the plurality of different isolated tenants.

11. The method of claim 10, wherein the current service function is either network address translation or firewall and the service-layer attribute includes a number of bindings of the particular tenant; or the current service function includes caching data and the service-layer attribute includes an occupancy layer of cache for the particular tenant.

12. The method of claim 10, wherein said service-layer operations data includes a service-layer performance metric of said applying the current service function to the particular service chain data packet, in addition to the service-layer attribute of the current operational health of the current service function of the particular tenant.

13. The method of claim 1, wherein said received particular service chain data packet includes a service-layer performance profile defining on a per-packet basis said service-layer operations data to be said added to the particular service chain data packet; and wherein said adding service-layer operations data to the particular service chain data packet is performed in response to the service-layer performance profile.

14. The method of claim 13, wherein said service-layer operations data includes a service-layer attribute of a current operational health of the current service function; and wherein the current operational health includes a video or data cache hit or miss statistic, or a number of available or used network address translation or firewall bindings.

15. The method of claim 13, wherein said service-layer operations data includes a service-layer performance metric of said applying the current service function to the particular service chain data packet in addition to a service-layer attribute of the current operational health of the current service function.

16. The method of claim 1, wherein the particular service node applies the current service function to packets received with a first network address and a second network address; and wherein the first network address signals to the particular service node to add service-layer operations data to a packet with the first network address, while the second network address signals to the particular service node not to add service-layer operations data to a packet with the second network address.

17. The method of claim 1, comprising:
    receiving the particular service chain data packet by a network transport layer packet switching device; and
    adding networking operations data to the particular service chain data packet; and
    sending the particular service chain data packet with said service-layer and networking operations data from the network transport layer packet switching device.

18. The method of claim 1, wherein the service-layer operations data is said added to an Internet Protocol version 6 (IPv6) extension header in the particular service chain data packet.

19. The method of claim 1, wherein the service-layer operations data is said added to a Network Service Header (NSH) in the particular service chain data packet.

20. The method of claim 1, wherein the service-layer operations data is said added to a Segment Routing (SR) header in the particular service chain data packet.

21. The method of claim 1, wherein the service-layer operations data is said added to an Internet Protocol version 4 (IPv4) header in the particular service chain data packet.

22. The method of claim 1, wherein the service-layer operations data is said added to a Virtual Extensible Local Area Network-Generic Protocol Extension (VXLAN-GPE) header in the particular service chain data packet.

23. A method, comprising:
    receiving a particular service chain data packet by a particular service node, with the particular service chain data packet including a header identifying a service group defining one or more service functions to be applied to the particular service chain data packet, with the particular service chain data packet being a data packet and not a probe packet;
    adding service-layer operations data or networking operations data to the particular service chain data packet by the particular service node in response to a current entry of the service group to the particular service chain data packet; and
    after said adding operations data, sending the particular service chain data packet with said service-layer or networking operations data from the particular service node.

24. The method of claim 23, wherein said adding service-layer operations data or networking operations data to the particular service chain data packet by the particular service node includes adding service-layer operations data to the particular service chain data packet.

25. A particular service node, comprising:
    one or more processing elements;
    memory;
    one or more interfaces sending and receiving packets; and
    wherein the packet switching device perform operations including:
    receiving a particular service chain data packet, with the particular service chain data packet including a header identifying a service group defining one or more service functions to be applied to the particular service chain data packet, with the particular service chain data packet being a data packet and not a probe packet;
    adding service-layer operations data or networking operations data to the particular service chain data packet in response to a current entry of the service group to the particular service chain data packet; and
    after said adding operations data, sending the particular service chain data packet with said service-layer or networking operations data from the particular service node.

26. The particular service node of claim 25, wherein said adding service-layer operations data or networking operations data to the particular service chain data packet includes adding service-layer operations data to the particular service chain data packet.

\* \* \* \* \*

UNITED STATES PATENT AND TRADEMARK OFFICE
CERTIFICATE OF CORRECTION

PATENT NO. : 10,348,648 B2
APPLICATION NO. : 15/156689
DATED : July 9, 2019
INVENTOR(S) : Pignataro et al.

Page 1 of 1

It is certified that error appears in the above-identified patent and that said Letters Patent is hereby corrected as shown below:

In the Specification

Column 3, Line 17, "term's" should read -- terms --

Column 4, Line 24, "info' nation" should read -- information --

Column 9, Line 46, "foil is" should read -- forms --

In the Claims

Column 10, Claim 7, Line 51, "of a current" should read -- of the current --

Signed and Sealed this
Nineteenth Day of November, 2019

Andrei Iancu
*Director of the United States Patent and Trademark Office*